Dec. 25, 1928.                                                                                            1,696,203
G. KRELL ET AL
VARIABLE SPEED TRANSMISSION
Filed Aug. 25, 1927            8 Sheets-Sheet 5
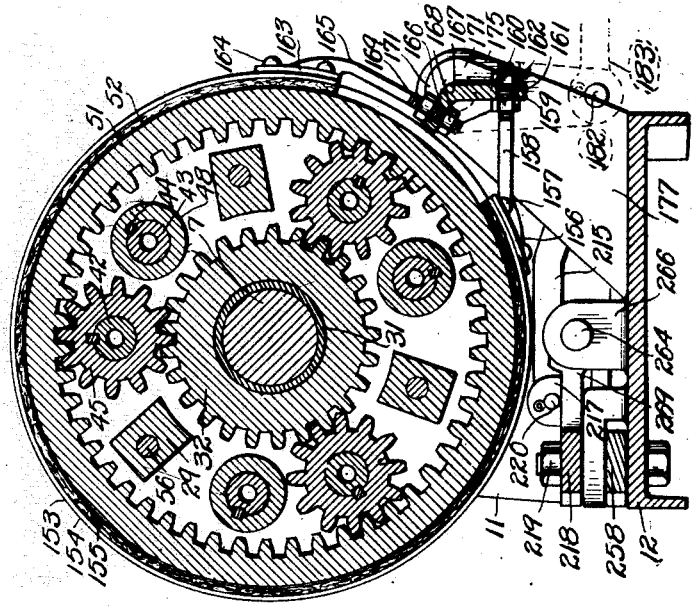
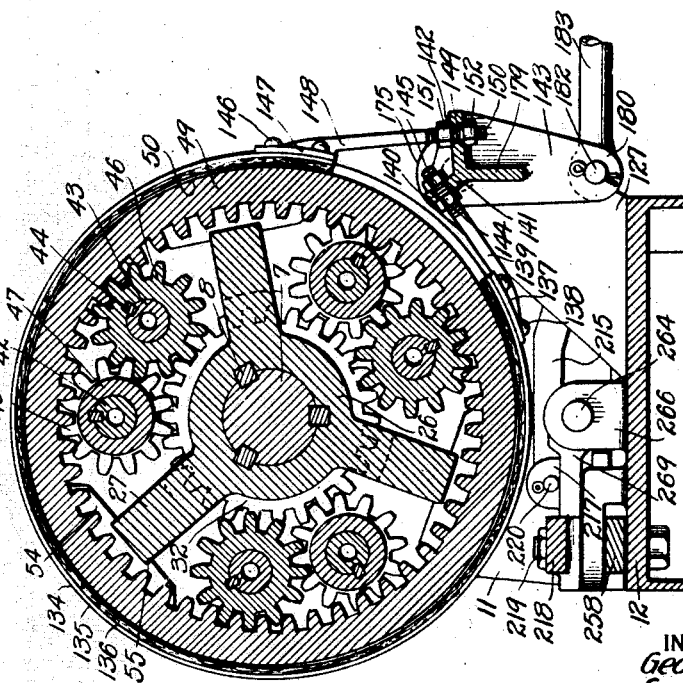
INVENTORS
George Krell &
BY Guy M. Martinet
ATTORNEY Dec. 25, 1928.
G. KRELL ET AL
1,696,203
VARIABLE SPEED TRANSMISSION
Filed Aug. 25, 1927    8 Sheets-Sheet 6
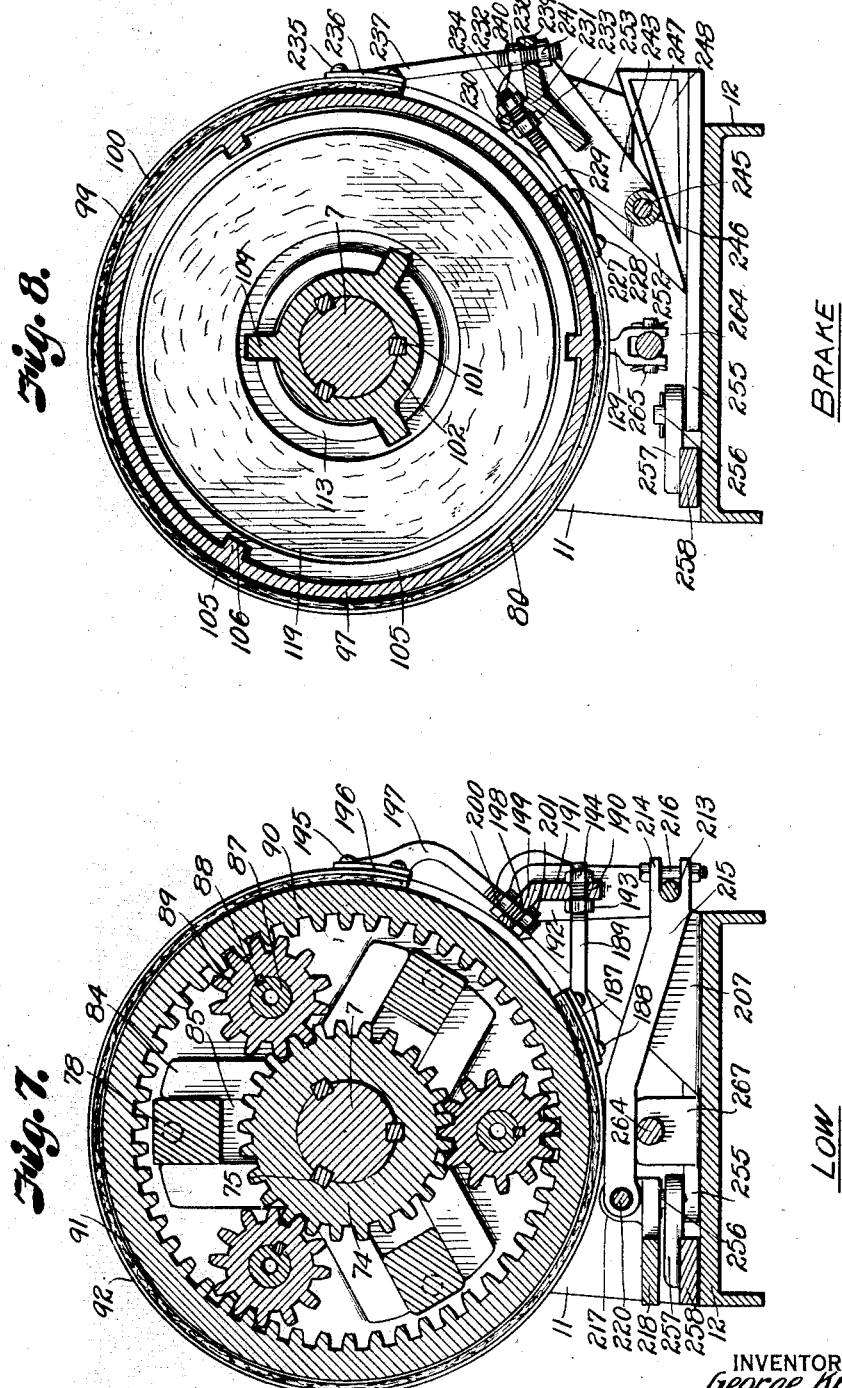
INVENTORS
George Krell &
BY Guy M. Martinet
Arthur C. Brown
ATTORNEY

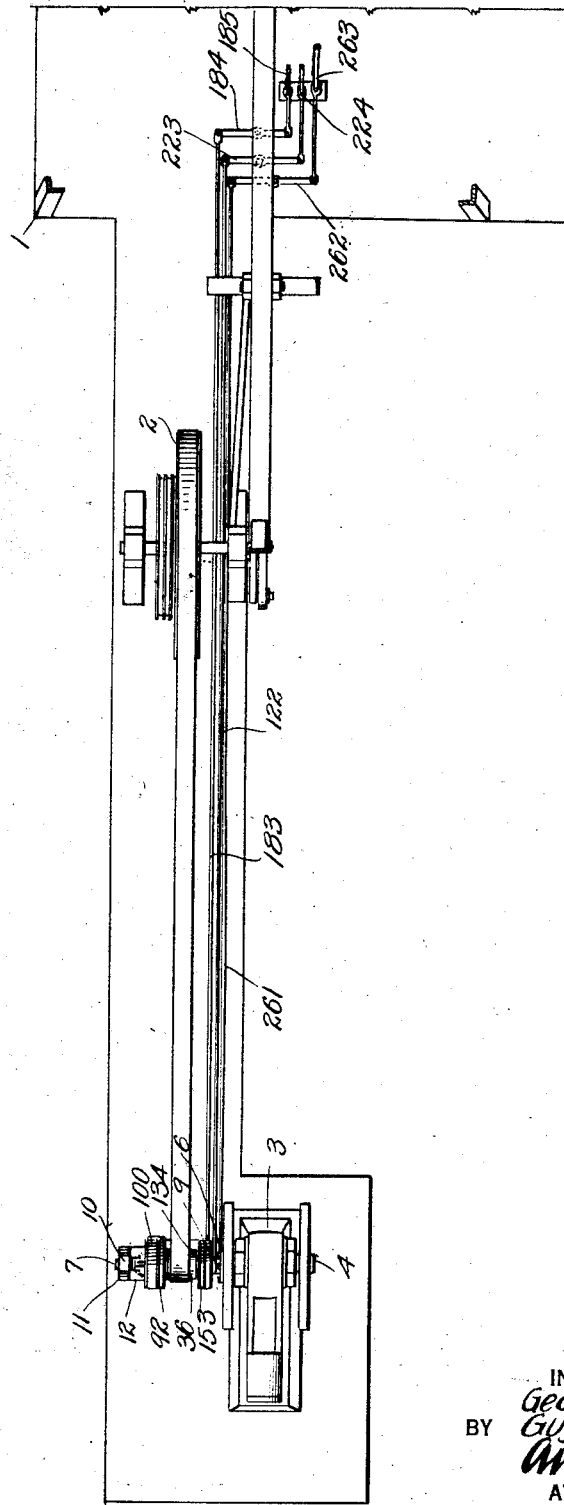

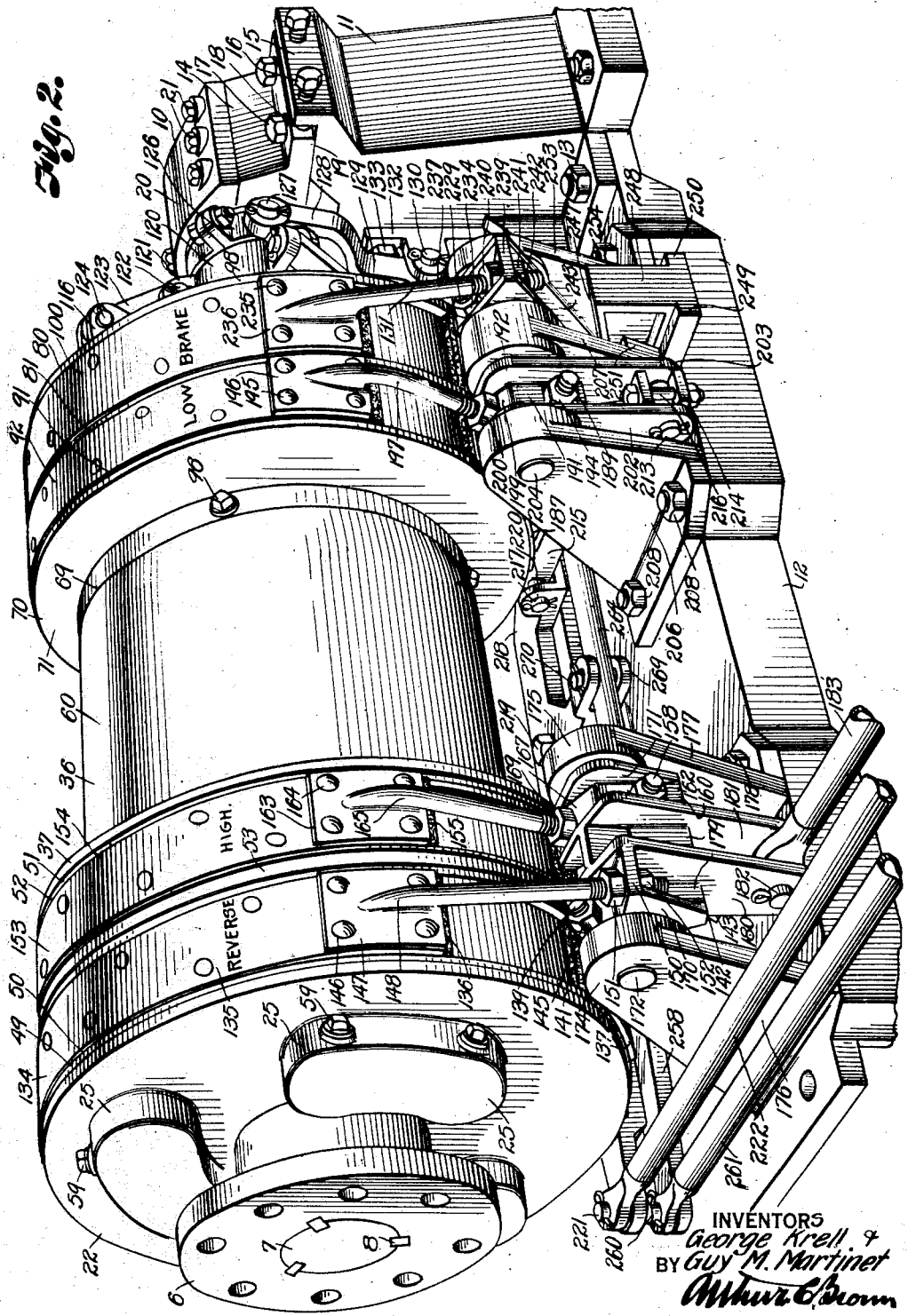

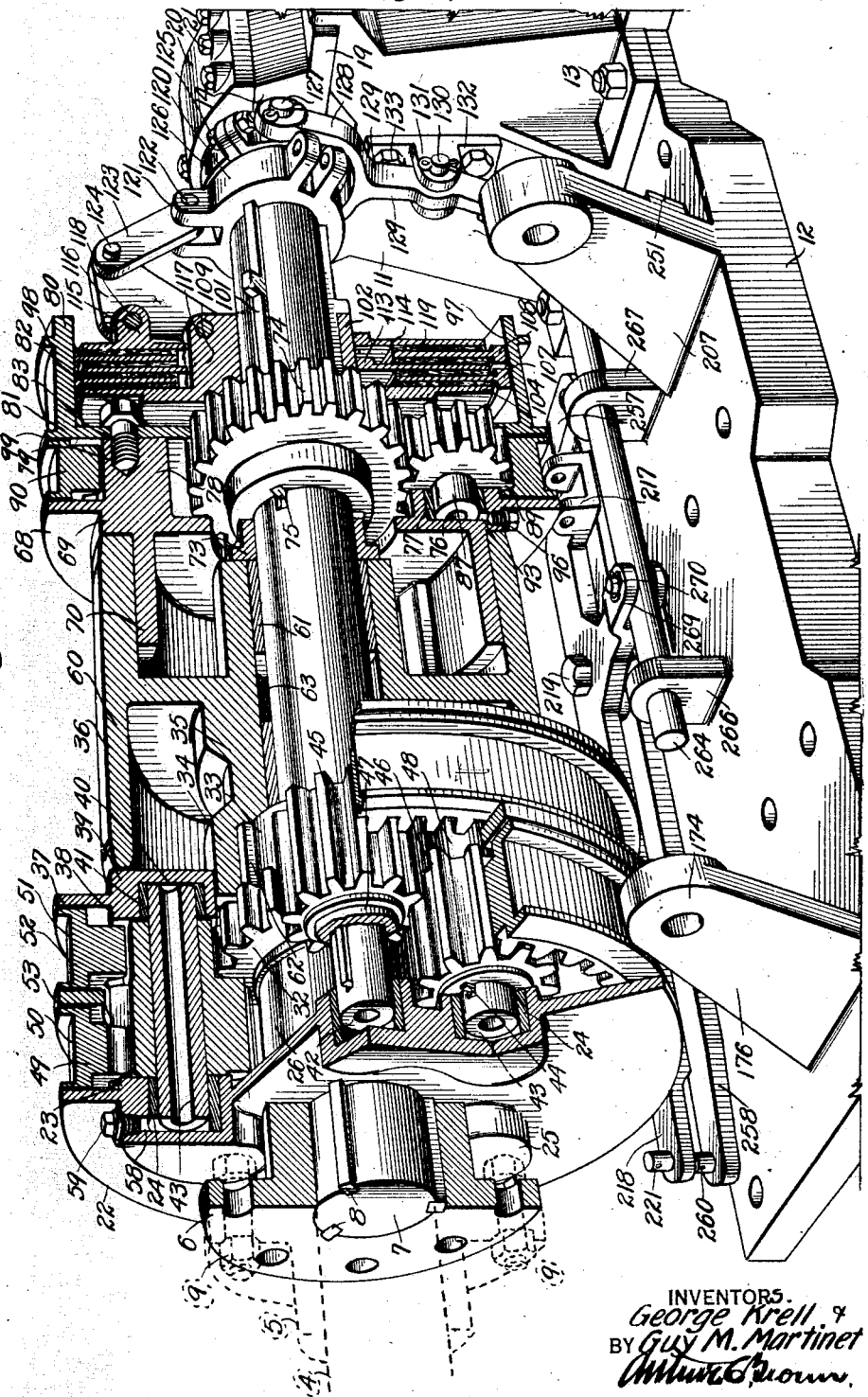

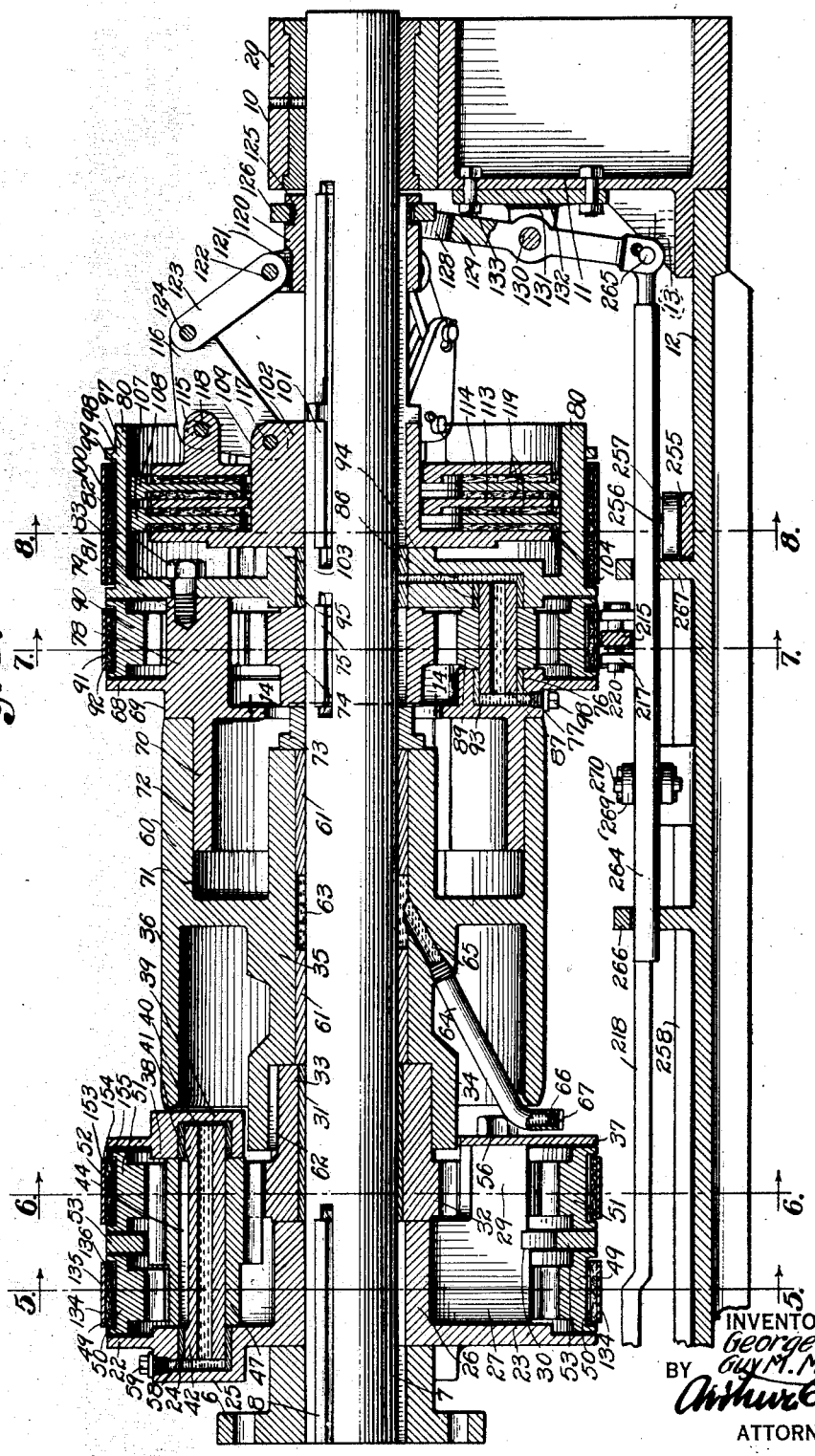

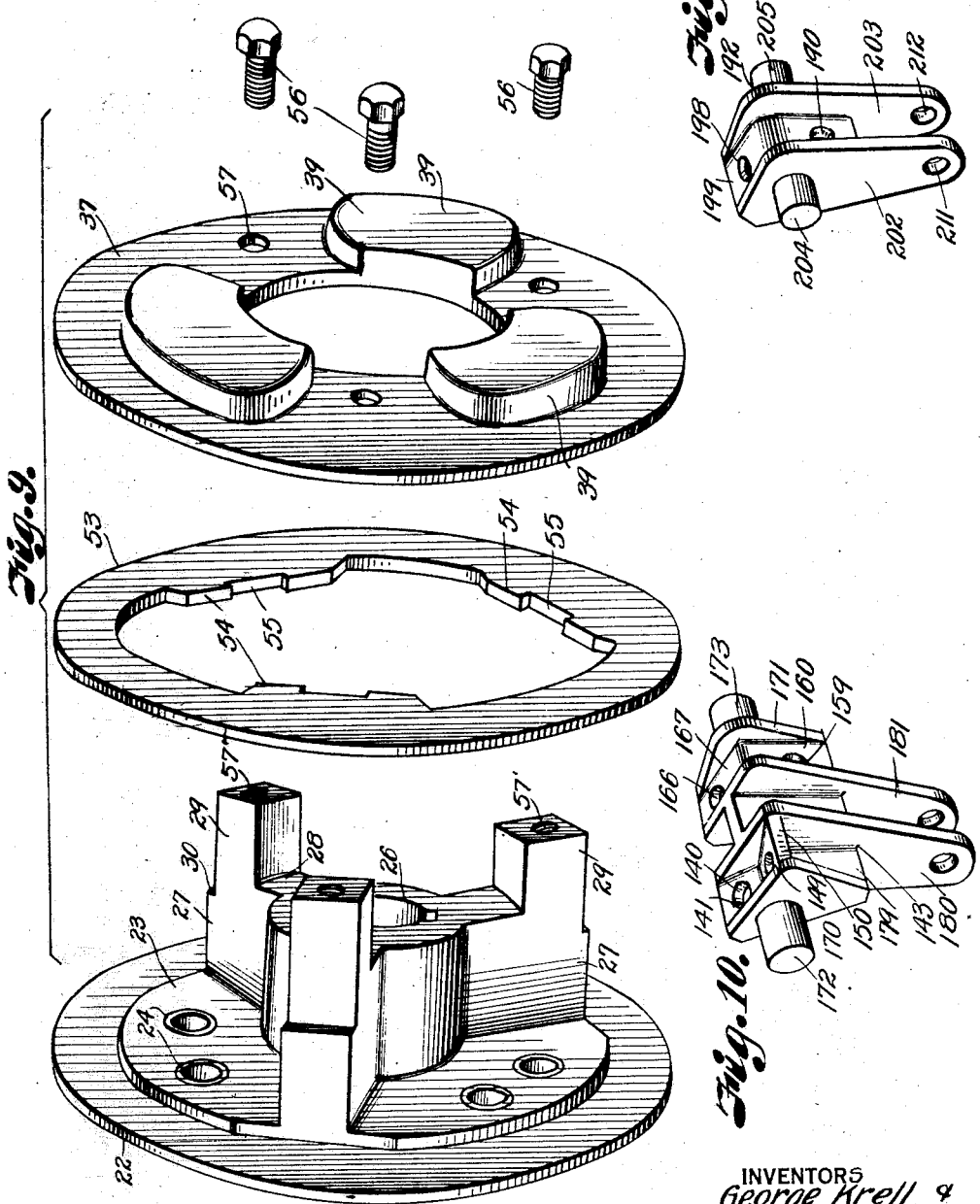

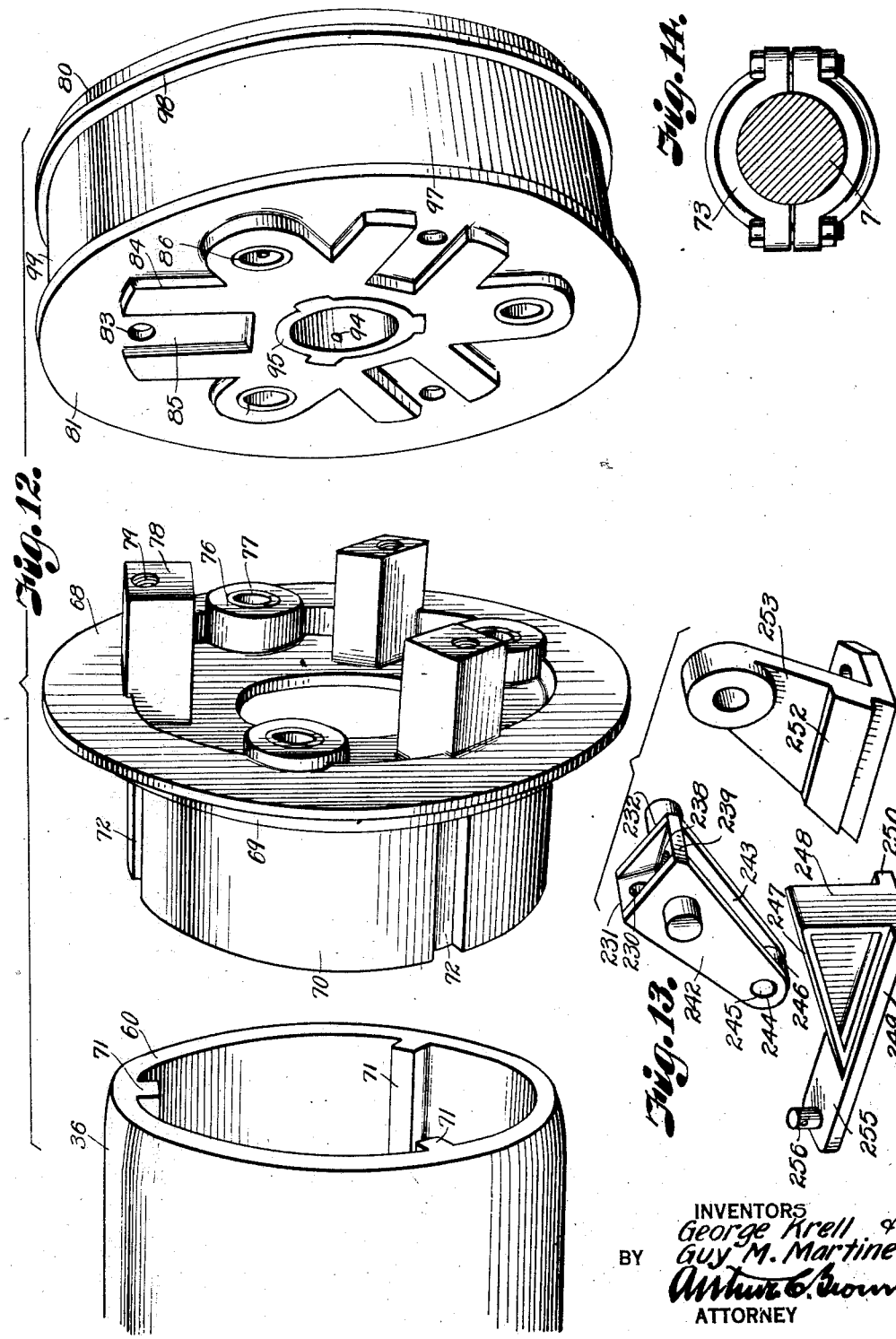

Patented Dec. 25, 1928.

1,696,203

UNITED STATES PATENT OFFICE.

GEORGE KRELL AND GUY M. MARTINET, OF SAPULPA, OKLAHOMA; SAID MARTINET ASSIGNOR TO SAID KRELL.

VARIABLE-SPEED TRANSMISSION.

Application filed August 25, 1927. Serial No. 215,454.

Our invention relates to variable speed transmission mechanism and more particularly to apparatus of that character adapted for use in connection with standard oil well drilling rigs for letting in and pulling casing, tubing and tools or for other hoisting purposes; the principal object of the invention being to provide mechanism for transmitting the power of an explosion engine at variable forward speeds and in reverse to adapt the power to the widely variant power and speed requirements incident to oil well drilling.

In accomplishing this object we have provided improved details of structure, the preferred forms of which are illustrated in the accompanying drawings, wherein:

Fig. 1 is a plan view illustrating application of the transmission for operating standard well drilling equipment from a gas engine.

Fig. 2 is an enlarged detail perspective view of the transmission units including the variable speed drums and their selecting mechanism.

Fig. 3 is an irregular sectional perspective view of the transmission mechanism, illustrating the selective planetary gears and the friction clutch.

Fig. 4 is a central, longitudinal, vertical section of the transmission mechanism.

Fig. 5 is a transverse vertical section on the line 5—5, Fig. 4.

Fig. 6 is a transverse vertical section on the line 6—6, Fig. 4.

Fig. 7 is a transverse vertical section on the line 7—7, Fig. 4.

Fig. 8 is a transverse vertical section on the line 8—8, Fig. 4.

Fig. 9 is a detail perspective view of the high speed and reverse gear mounting elements in spaced but relative relation.

Fig. 10 is a detail perspective view of the high speed and reverse gear band levers.

Fig. 11 is a detail perspective view of the low speed gear band lever.

Fig. 12 is a detail perspective view of a portion of the belt pulley and low and intermediate speed gear drums in spaced but relative relation.

Fig. 13 is a detail perspective view of the brake band lever elements in spaced but relative relation.

Fig. 14 is a section of the thrust bearings for the low and intermediate speed gear drums, on the line 14—14, Fig. 4.

Referring more in detail to the drawings:

1 designates a derrick of a type commonly employed for standard oil well drilling, 2 a band wheel for operating the working parts of the drilling mechanism, and 3 an explosion engine of any suitable type for furnishing power for operating the band wheel 2.

Connected with the engine shaft 4 (Fig. 3) through the flanged couplings 5 and 6 is a transmission shaft 7, longitudinally aligned with the engine shaft and locked thereto for rotation therewith through the spline 8 on the transmission shaft, bolts 9 which connect the coupling flanges, and the keyed connection of the coupling flange 5 with the engine shaft in accordance with common practice. The end of the shaft 7 opposite the engine connection is journaled in an adjustable bearing 10 on a pillar 11 supported on a base 12 carried by the derrick mud sills or other foundation and attached to the base by bolts 13. The pillar comprises a block 14 transversely adjustable between the rails 15 on the pillar 11 under influence of set screws 16 and locked to the pillar by cap screws 17 extending through slots 18 in the block flanges 19 into threaded sockets in the upper base of the pillar, and an ordinary bearing cap 20, secured to the body of the block by cap screws 21. The bearing blocks may be vertically adjusted by shims (not shown) interposed beneath the block.

Mounted on the single transmission shaft and in order from left to right as illustrated in the several figures and indicated by legend in Fig. 2 are the reverse and several speed mechanisms which will be described in order of their arrangement, starting with the reverse gear mechanism at the left hand end of the shaft.

22 (Fig. 9) designates a disk keyed to the shaft 7 by the spline 8, having a reinforcing plate boss 23 on its inner face and containing three equally spaced pairs of bushings 24 extending through the plate boss and disk into the reinforcing bosses 25 on the outer face of the disk.

Integral with the disk 22 extending from the inner face thereof is a spacing collar 26 and integral with the disk and with the collar are three radial ribs 27 equally spaced and alternating with the pairs of bushings 24, the ribs terminating short of the periphery of the plate boss 23 and the boss being cut away to provide flat faces 28 for a purpose presently apparent.

The ribs 27 are provided with extensions 29 spaced substantially from the shaft 7 and provided with inset seats 30 in their outer faces and with interiorly screw-threaded end sockets 57'. Rotatably mounted on a bushing 31 (Fig. 4) on the shaft 7 in end abutment with the collar 26 of the disk 22 is a gear wheel 32 of a diameter to rotate closely within the offset extension 29 of the ribs 27, the inner end of the gear wheel having an extended hub 33 receivable within the collar 34 on the hub 35 of a pulley wheel 36 presently described, and in end abutment with said hub to constitute the gear wheel and its hub, a thrust collar for spacing the pulley wheel. Surrounding the pulley hub collar 34 is a disk 37 having reinforcements 38 and 39 extending from its inner and outer faces and provided with sockets 40 containing paired bushings 41 aligning with the bushings 24 in the disks 22.

Journaled in the bushings 24 and 41 are hollow shafts 42 and 43 (Figs. 5 and 6) and keyed to the shafts 42 and 43 by splines 44 are pinions 45 and 46, each of a length but slightly greater than half the distance between the disks 22 and 37, and oppositely arranged so that the pinions on each pair mesh at their overlapping ends only, the pinions 45 being spaced to the right by hub extensions 47 which engage the disk 22 and the pinion 46 being spaced to the left by hub extensions 48 which engage the disk 37. All of the pinions 45 mesh with the gear 32 loose on the shaft 7 and provide indirect driving connection to the gear 32 from the pinions 46 of the several pinion pairs. Enclosing the outer set of pinions 46 and meshing therewith in an internal ring gear 49 having a peripheral groove 50 for a brake band presently described, and enclosing the right hand set of pinions 45 is an internal ring gear 51 having a peripheral band groove 52, the rings 49 and 51 being separated by a spacing ring 53 having equally spaced inner ribs 54 provided with slots 55 for the annular ribs 27 on the hub 26 of the disk 22 to lock the ring 53 to the disk 22, the disk 37 being locked to the disk 22 by cap screws 56 which extend through apertures 57 into the threaded sockets 57' in the ends of the rib extensions 29 on the plate 22. The two disks and the spacer ring 53 form a housing unit for the gear rings and mounting for the pinions which are also rotatable with the shaft because of the keyed connection of the disk 22 therewith.

Each of the bosses 25 on the outer face of the disk 22 is provided with a drill hole 58 for supplying lubricant to the bearing sleeves 24 and 41, the drill holes being normally closed by screw plugs 59.

The gear wheel 32 constitutes a sun gear, the pinions 45 and 46 respective sets of planets, and the ring gears 49 and 51 orbit gears for the sets of planets 45 and 46.

The pulley 36 is preferably of skeleton formation comprising the hub 35 and rim 60, the rim extending to the right beyond the end of the hub. The pulley 34 is rotatable on bushings 61 on the shaft 7 and is keyed to the hub 33 of the sun gear 32 by a spline 62 to be rotated under influence of the sun wheel under the conditions which will presently be described. The bushings 61 are spaced to provide an oil chamber 63 therebetween, which may be supplied through a pipe 64 threaded into a channel 65 leading to the chamber 63 and terminating at its outer end in a filler neck 66 normally closed by a screw cap 67.

Located at the right hand end of the pulley 34 is a disk 68 having a hub 69 extended inwardly toward the pulley and abutting against the pulley rim. Inset from the periphery of the hub is a neck 70 contained within the right hand end of the pulley and keyed thereto by tongues 71 on the inner wall of the pulley rim, which seat within grooves 72 in the outer face of the neck 70, thereby locking the disk to the pulley. 73 designates a thrust collar fixed on the shaft in abutment with the pulley hub and 74 a sun gear wheel keyed to the shaft 7 by splines 75 and abutting against the collar 73.

Formed integrally with the hub 69 including the disk 68 and neck 70 are equally spaced bearing bosses 76 containing bushings 77, and alternating with the bosses and integral with said head are spacing blocks 78 having threaded end sockets 79. 80 designates a drum rotatable on the shaft 7 and including a left hand end disk 81, abutting against the ends of the spacing blocks 78 and secured thereto by bolts 82 which project through apertures 83 in the disk 81 into the threaded sockets 79 in the blocks to securely attach the drum to the blocks 78. Cast on the left hand face of the disk 81 is a spider 84, having slots 85 for receiving the ends of the spacing blocks 78 and having bushings 86 registering with the bushings 77 on the head 69. With the spider arrangement, the blocks 78 not only serve as spacers for the drum 80 but also as propelling elements in contact with the side walls of the spider slots, thereby relieving the cap screws 82 and possibly preventing shearing of the screws under heavy load.

Mounted in the bushings 77 on the disk 68 and bushings 86 on the drum 80 respectively are journal sleeves 87, and keyed on said sleeves by splines 88 are pinions 89 meshing with the interior teeth of a ring gear 90 having floating support on the pinions and provided with an exterior band groove 91 for a brake band 92, presently described.

The hub member 76 of the disk 68 has a drill hole 93 extending through the bushing 87 to communication with the hollow bearing sleeve, and the web of the drum 80 has a drill hole 94 extending through the bushing 86 and shaft bushing 95 to conduct lubricant to the bearing, the drill hole 93 being normally closed by a screw cap 96.

The drum 80 includes a rim 97 of substantial width inset from the edge of the end disk 81 and provided with a circumferential rib 98 forming a groove 99 for a brake band 100 which will presently be described.

Keyed on the shaft 7 by splines 101 is a collar 102 adapted for stop engagement with the hub 103 of the drum 80 and provided with an extended head plate 104 at its inner end. Keyed for transverse movement within the rim 97 of the drum 80 by splines 105 on the inner surface of the rim 97 and grooves 106 in the edge of the rings are two clutch rings 107 and 108. Located between the plates 107 and 108 and keyed for transverse movement by splines 109 on the collar 102 (Fig. 8) is a clutch ring 113.

Located exteriorly of the clutch plate 104 and keyed for transverse movement within the drum by the splines 109 on the collar 102 is a compressor ring plate 114, having outstanding ears 115. 116 designates toggle lever arms consisting of paired triangular plates pivotally mounted at one angle on a pin 117 on a spline 109 and at another angle on a pin 118 on an ear 115 of the compressor ring plate 114 so that when the arm is rocked in one direction it will force the compressor plate inwardly to effect the clutch relation, and when moved in the opposite direction, will relieve the clutch. 119 designates fiber rings interposed between the head plate 104 and the clutch plate 107 between the respective clutch plates and between the outer plate 108 and the compressor ring plate 114 in accordance with common practice for providing an effective friction clutch.

Keyed for longitudinal movement on the shaft 7 at the right hand side of the drum 80 is a sleeve 120, having ears 121 at its inner edge provided with pins 122 mounting the toggle lever arms 123 which are connected with the lever arms 116 through the pivot pins 124. The sleeve 120 has an annular groove 125 at its outer end rotatably mounting a ring 126 having oppositely directed pins 127 pivotally mounting the yoke arms 128 of a shifting lever 129 pivotally mounted on a pin 130 carried between the arms 131 of a bracket 132 attached to the pillar 11 by bolts 133.

As heretofore stated, the mechanism at the left hand end of the sector constitutes a composite, reverse and high speed gearing and that at the right hand end a low speed gearing, a brake mechanism and a friction clutch for imparting intermediate speed drive. This is all dependent on selective operation of brake bands on the several ring or orbit gears and on the drum 83 or by manipulation of the friction clutch through the shifting mechanism above described.

Referring now to the mechanism for selecting the speed at which power is to be transmitted, and first to the band for the orbit gear 50 for the reverse gear mechanism, 134 designates a brake band of common construction in that it includes the metal strap 135 and fibrous lining 136. 137 (Figs. 2 and 5) designates a plate attached to the lower end of the band 134 by rivets 138 and provided with a bolt 139 which extends forwardly at an upward angle through an aperture 140 in the web 141 of a Y head 142 of a double headed or composite lever 143 (Fig. 10) and is fixed to the web by the nuts 144 and 145.

Attached to the opposite end of the band 135 by rivets 146 is a plate 147, having a bolt 148 extended through an aperture 149 in a normally horizontal web 150 of head 142 and attached thereto by nuts 151 and 152.

The band 153 on the orbit gear 51 for the high speed gear set paired with the reverse gear mechanism also comprises a metal strip 154 and fabric lining 155. The lower end of the band having a plate 156 secured thereto by rivets 157 and provided with a bolt 158 which extends forwardly and substantially horizontally through an aperture 159 in the web 160 of the head 142 of the composite lever and secured by nuts 161 and 162. The opposite end of the band 153 has a plate 163 secured thereto by rivets 164 and is provided with a bolt 165 which extends downwardly at a rearward angle through an aperture 166 in the rearwardly and upwardly directed web 167 of the head 142, and is secured thereto by nuts 168 and 169.

The lever 143 comprises in addition to the web heretofore mentioned, end plates 170 and 171, having trunnions 172 and 173 journaled in bearings 174 and 175 on legs 176 and 177 on the base 12, the leg 176 being preferably cast integral with the base 19, but the leg 177 formed separately and attached thereto by bolts 178 in order to provide for assembly of the trunnion lever.

The heads 142 are connected by webs 179 and their inner walls 180 and 181 are extended downwardly as lever arms. Pivoted on a pin 182 carried by the lower ends of the arms 180 and 181 is an operating rod 183 which is extended forwardly to the derrick floor (Fig. 1) and there connected with a rocking arm 184 operable from a handle lever 185. With this arrangement either of the bands may be tightened on its orbit gear according to direction of movement of the handle lever to selectively determine reverse or high speed forward operation of the band wheel as will presently be more specifically described.

Referring now to the low speed gear, 187 designates a plate secured to the lower end of the orbit gear band 92 by rivets 188, and having a bolt 189 extending forwardly and substantially horizontally through an opening 190 in the web 191 of a lever head 192 and secured thereto by nuts 193 and 194. Fixed to the opposite end of the band 92 by rivets 195 is a plate 196 having a bolt 197 extending downwardly and rearwardly through an opening 198 in the web 199 of the head 192 and secured thereto by nuts 200 and 201. The lever head 192 comprises the side arms 202 and 203, having trunnions 204 and 205 journaled in legs 206 and 207 on the base 19, the leg 207 being preferably cast with the base and the leg 206 secured thereto by bolts 208 to provide for assembly of the lever member.

The arms 202 of the head 192 are extended to form lever arms having apertures 211 and 212 in their free ends carrying a pin 213. Located between the arms is a yoke head 214 of a connecting arm 215, the yoke head straddling the pin 213 and having its end closed by a bolt 216 to confine the pin 213 so that the lever may be rocked in either direction according to movement of the bar 215. At its rear end the bar 215 is located between a pair of ears 217 (Fig. 2) on a rocker bar 218 pivotally mounted on a pin 219, carried by the base 19, the ears 217 carrying a pin 220 on which the connecting arm 215 is pivotally mounted. The rocker bar extends to the left hand end of the structure and is provided at said end with a pin 221 on which is pivotally mounted the rear end of an operating rod 222 which extends forwardly to the derrick floor and is there pivotally connected with the rocking arm 223 connected with an operating handle 224 whereby the lever mechanism just described may be operated to tighten or loosen the band 92 on the low speed orbit gear.

Referring now to the brake mechanism, the band 100 on the drum 80 corresponding in construction to the brake bands heretofore described, has a plate 227 attached to its lower end (Fig. 8) by rivets 228 and provided with a bolt 229 which extends forwardly and upwardly through an aperture 230 in the web 231 of a lever head 232 and secured thereto by nuts 233 and 234. Secured to the opposite end of the band 100 by rivets 235 is a plate 236 having a bolt 237 extended downwardly and forwardly through an aperture 238 in the web 239 of the lever head 232 and secured thereto by nuts 240 and 241.

The lever head 232 has side arms 242, 243 (Fig. 13) extended downwardly and rearwardly and provided with apertures 244. A pin 245 connecting the arms 242 and 243 has its ends seated in the apertures 244 and carries a roller 246 in contact with the inclined face 247 of a wedge block 248 having flanges 249—250 movable on the guide flanges 251—252 on the leg 207 and a mating leg 253 secured to the base 12 by bolts 254. The wedge block 248 has a base 255 extended rearwardly and provided with an upstanding pin 256 carrying a coupling bar 257 attached to the rocking bar 258 which is also pivotally mounted on the bolt 219 and extends to the left hand of the structure where it carries an upstanding pin 260. Mounted on the pin 260 and extending forwardly to the derrick floor is an operating rod 261, connected with the rocking arm 262, which in turn is connected with a handle lever 263 whereby the wedge block may be moved forwardly or back on the supporting base to tighten or loosen the brake bands on the drum 80.

Referring now to the friction clutch mechanism whereby the pulley may be driven at intermediate speed, 264 designates a rod pivotally connected with the shifting lever 129 by a pin 265. The rod 264 is slidably mounted in guide ears 266 and 267 on the base 12 forwardly of the rocking arms 218 and 258. The rocking arm 218 has a forwardly extended yoke 269 straddling the rod 264 and connected therewith by a pin 270. Consequently when the arm 218 is rocked from one extreme to the other, it will loosen the band on the low speed orbit gear and operate the toggle mechanism to close the friction clutch and effect operation of the band wheel at intermediate speed, opposite movement of the arm 218 loosening the intermediate speed clutch and tightening the band on the low speed orbit gear.

In describing operation of apparatus embodying the invention it will be assumed that the transmission is employed in connection with an explosion engine of ample power for letting in or pulling tools, tubing or casing into or from an oil well of considerable depth, and first that it is desired to pull a string of heavy tools from the bottom of the well.

As the tools weigh several tons and this weight is supplemented by that of the wire line or cable, considerable power is required for initial lift and the bull wheel upon which the line is wound should be moved at low speed to provide the greatest possible amount of power. Assuming that the handle levers on the derrick floor are all in neutral position, the first step of the operation is to connect the engine with the band wheel through the low speed gearing. This is effected by rocking the handle lever 224 forwardly, thereby drawing the connecting rod 222 forwardly and rocking the arm 218 clockwise and the lever head 192 anti-clockwise (Fig. 7) to tighten the band 97 on the orbit gear wheel 91 and lock the orbit gear wheel against rotation.

The transmission shaft being keyed to the engine shaft, continues to revolve, carrying with it the sun wheel 74 in clockwise direction. The planets 89, meshing with the sun and orbit gears, are caused to rotate therebetween and planetate about the sun wheel, thereby rotating the disk 68 which, being keyed to the pulley 36, rotates the pulley also in clockwise direction. The planets 89 being in reduced ratio to the sun wheel, reduce the speed of the shaft proportionately, thereby effecting operation of the pulley at less than the speed of the engine, a reduction in speed greater than that represented by the gear ratio being effected because of planetation of the pinions in a direction opposite to that of travel of the shaft.

After the tools have been pulled for a considerable distance up in the well and a corresponding amount of wire line or cable is wound on the bull wheel, the load is proportionately reduced and less power required and the speed may be increased. This increased speed is effected by shift from low to intermediate gear. To effect the shift of speed the lever 224 is moved past neutral to forward position, thereby moving the arm 218 anti-clockwise and the lever 192 clockwise, spreading the band 91 and releasing the orbit gear 90 so that it may revolve idly. Simultaneously with release of the band 91, the rod 264 is moved to the right, rocking the lever 129 and shifting the collar 118 toward the left on the transmission shaft. Movement of the collar in this direction tends to close the toggle levers and compress the friction clutch, thereby locking the drum 80 to the transmission shaft and rotating the drum at the speed of the shaft. The drum 80, being attached to the disk 68 which is keyed to the pulley 36, rotates the pulley to drive the band wheel and bull wheel at intermediate speed, which is the speed of the shaft.

As the tools approach the top of the well, the weight of the load is further reduced by elimination of weight of the wire line or cable and the speed can be further increased. This increase to high speed is effected by release of the friction clutch and application of the high speed gear, release of the friction clutch being effected by return of the lever 224 and application of the high speed gear by advance of the lever 185.

When the bull wheel is to be driven at high speed, the handle lever 185 is drawn rearwardly (to the right, Fig. 1), drawing the rod 183 rearwardly and rocking the composite head 142 anti-clockwise, this movement of the lever head tightening the band 152 on the orbit gear member 51, locking the orbit gear against rotation; the anti-clockwise movement of the composite lever spreading the band 134 on the orbit gear 49 of the reverse mechanism so that the gear 49 is free to revolve. The disk 22, being keyed to the transmission shaft 7, rotates with the shaft and the planet gears 45 being journaled in the disks 22 and 37, are carried about the shaft and, meshing with the locked orbit gear, planetate in relation to the sun gear 32 and in mesh therewith, rotating the sun gear forwardly at a speed represented by that of the planet gear on its axis plus that of rotation of the planets around the transmission shaft and which, when the parts are proportioned substantially as illustrated in the present drawings, effects a forward drive of the sun gear at about three times the speed of the transmission. The pulley, being keyed to the sun gear 32, travels therewith to operate the band wheel at such high speed.

It is customary to let the tools into the well under control of the brake but owing to their weight, particularly when supplemented by weight of the wire line when the well is deep, compression in the engine cylinders is employed to supplement the brake control and to retain positive control of the tools and also to regulate speed of the letting in travel by actuation of the engine. For this reason it is desirable to let in the tools by reverse actuation of the transmission under engine control. When this is to be effected, the hand lever 185 is pushed forwardly (to the left, Fig. 1), releasing the high speed orbit gear and locking the reverse speed orbit gear 49. When the engine is operated with such gear setting, the planet gears 46 are caused to planetate about the transmission shaft in mesh with the locked orbit gear 49. The pinions 45 meshing with the pinions 46 of the reverse gear shaft, rotate the pinions 45 reversely to their normal travel for high speed operation and in mesh with the sun gear 32, driving the sun gear and the pulley to which the sun gear is keyed, in a reverse direction and at substantially three times the speed of the transmission shaft for the reason heretofore stated in connection with the high speed operation.

When the brake is to be set to control the letting in of the tools, either by the brake alone, or in conjunction with the reverse gear mechanism, the lever 263 is drawn rearwardly, moving the pull rod 261 in the same direction and rocking the arm 258 anti-clockwise, drawing the wedge head 248 rearwardly and prying the lever arms 242—243 upwardly to rock the head 232 and its trunnions and tightening the brake band on the drum 80.

It is apparent that with the arrangement of parts illustrated and described, the various operations may be effected with a minimum of operating parts, but with positive action, and that the shift from intermediate to either lower high speed, or vice versa, may be made without interruption of driving connection.

What we claim and desire to secure by Letters Patent is:

1. In combination with a transmission shaft, a driven member rotatable on the shaft, a sun gear wheel rotatable on the shaft and keyed to the driven member, a carrier keyed to the shaft, a plurality of sets of planet gear wheels rotatably mounted on the carrier, the gear wheels of one planet set meshing with those of the other set and with the sun gear wheel, an orbit gear member for each set of planet gear wheels, a second sun gear wheel fixed to said shaft, a carrier fixed to said driven member, an orbit gear wheel rotatably mounted on the second carrier and meshing with the second sun gear wheel, an orbit gear member for said last named planet gear wheel, and means for selectively locking the orbit gear members to determine speed and direction of travel of the driven member for constant speed of the shaft.

2. In combination with a transmission shaft, a driven member rotatable on the shaft, differential sun gear wheels, one rotatable on and the other fixed to the shaft, the rotatable sun gear wheel having keyed relation with the driven member, a carrier fixed to the shaft, inner and outer planet gear wheels rotatably mounted on the carrier with the inner planet and loose sun gear wheels in mesh, separate orbit gear members for the inner and outer planet gear wheels, a carrier fixed to the driven member adjacent the fixed sun gear wheel, a planet gear wheel rotatably mounted on the second carrier and meshing with the fixed sun gear wheel, an orbit gear member for said last named planet gear wheel, and means for selectively locking the orbit gear members.

3. In combination with a transmission shaft, a driven member rotatable on the shaft, differential sun gear wheels, one rotatable on and the other fixed to the shaft, the rotatable sun gear wheel having keyed relation with the driven member, a carrier fixed to the shaft, meshing inner and outer planet gear wheels rotatably mounted on the carrier with the inner planet and loose sun gear wheels in mesh, separate orbit gear members for the inner and outer planet gear wheels, a carrier fixed to the driven member adjacent the fixed sun gear wheel, a planet gear wheel rotatably mounted on the second carrier and meshing with the fixed sun gear wheel, an orbit gear member for said last named planet gear wheel, means for selectively locking the orbit gear members, and friction drive mechanism co-operative with the transmission shaft and with one of said carriers for rotating the driven member.

4. In combination with a transmission shaft, spaced carriers having fixed and loose mounting respectively on said shaft, a driven member interposed between the carriers and having loose and fixed relation respectively with the carriers, a sun gear wheel loose on the shaft adjacent the fixed carrier and having keyed relation with the driven member, meshing planet gear wheels rotatably mounted on the fixed carrier, and one only thereof meshing with the loose sun gear, separate orbit gear members for the respective planet gear wheels, a sun gear wheel fixed on said shaft adjacent the loose carrier, planet-gear wheels on the loose carrier meshing with the fixed sun gear wheel, an orbit gear member meshing with said last named planet gear wheels, and means for selectively locking the orbit gear members to determine speed and direction of travel of the driven member for constant speed of the transmission shaft.

In testimony whereof we affix our signatures.

GEORGE KRELL.
GUY M. MARTINET.